Oct. 6, 1964
L. BAUM
3,151,617
SYRINGE
Filed May 29, 1962
2 Sheets-Sheet 1
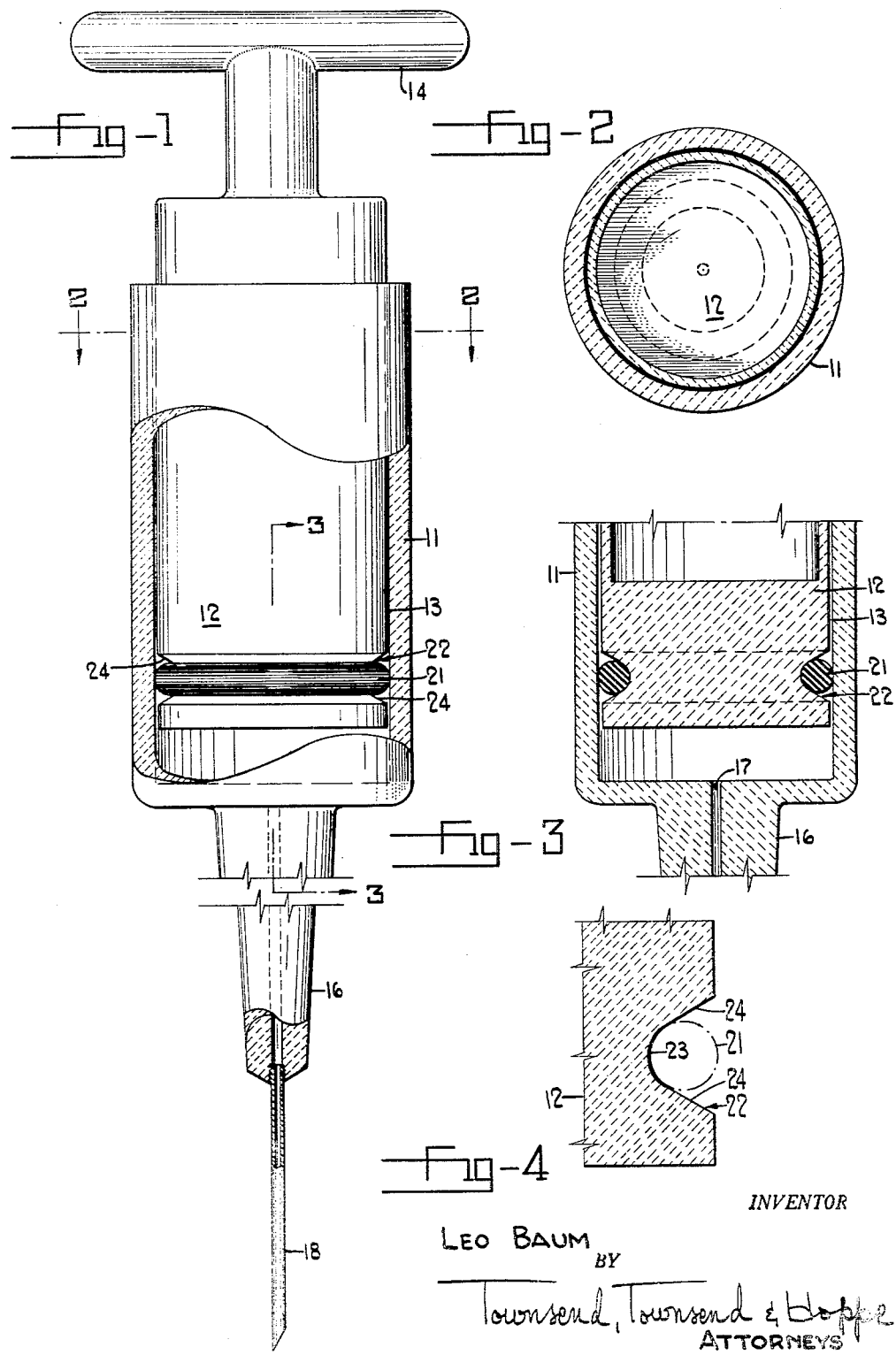
INVENTOR
LEO BAUM
BY
Townsend, Townsend & Hopf
ATTORNEYS

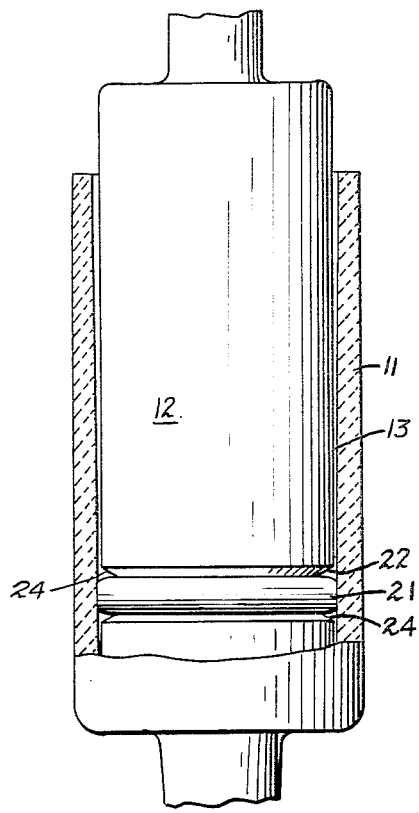

United States Patent Office 3,151,617
Patented Oct. 6, 1964

3,151,617
SYRINGE
Leo Baum, 1101 Broadway, Oakland 7, Calif.
Filed May 29, 1962, Ser. No. 205,816
1 Claim. (Cl. 128—218)

This invention relates to a new and improved syringe of the type for injecting fluids. The invention has particular reference to the construction of the cylinder and barrel for such syringe which employs a seal therebetween comprising a toroid which fits in a groove formed in the piston, and is a continuation-in-part of my co-pending application, Serial No. 447,320, filed August 2, 1954, now abandoned and entitled Syringe.

One of the problems in the construction of syringes is creating a tight fit between the piston and cylinder. Heretofore, various means have been employed to accomplish such a fit. In accordance with the present invention, the piston is made materially undersized as compared with the cylinder and a toroid, resilient ring is mounted on the piston, the ring fitting tightly against both the piston and the cylinder and accomplishing the tight fit required.

One of the features of the present invention resides in the shape of the groove in the piston in which the ring is mounted. Thus, the groove at its deepest portion is rounded at the same curvature as the toroid so that the ring fits securely in the bottom of the groove without any space between the inside of the ring and the bottom of the groove, thereby preventing fluids or foreign matter from lodging in the space between the ring and groove.

Outwardly of the rounded bottom of the groove, the sides of the groove are diverged at an angle of substantially 60°. The widening space between the groove and the ring adjacent the periphery of the piston affords room for expansion and "flow" of the ring as the piston is projected and retracted.

Another feature of the invention is the employment of a conventionally shaped and dimensioned resilient, rubber O-ring of the type finding an increasing use in industry. The ring is made of a resilient material such as rubber and preferably is of such chemical composition that it is not adversely affected by the components and solvents for fluids commonly injected in syringes for medicinal purposes. The characteristic of such rings is that they seal tightly between a piston and cylinder or other relatively movable parts and that the ring deforms upon application of pressure, the deformation of the ring functioning to effect a closer seal with the result that the stress imposed by the application of pressure functions to resist the tendency toward leakage which the application of such stresses would normally create.

It is a further object of the present invention to provide a syringe construction which includes a cylinder, a piston reciprocably slidable in the cylinder and in which the cylinder has a continuously increasing interior cross-section from bottom of the syringe to the top. The piston and cylinder are separated by an annular gap which continuously diminishes from top to bottom. There is a groove in the piston adjacent its inner end and a flexible O-ring of circular cross-section in the groove. The O-ring bears against the bottom of the groove and the inner wall of the cylinder to form a seal therebetween continuously during movement of the piston. This groove is shaped with a curvature at the bottom having a radius of curvature equal to the radius of the O-ring and has an outwardly diverging inner side wall and an outwardly diverging outer side wall, and wherein each of said walls diverges at an angle of substantially 60° with respect to the exterior of the piston. A handle is attached to the piston for reciprocating the piston.

Other objects of the present invention will become apparent upon reading the following specification and referring to the accompanying drawings in which similar characters of reference represent corresponding parts in each of the several views.

In the drawings:

FIG. 1 is an elevational view, partly broken away in section and partly broken away for reduction in length, showing a syringe made in accordance with the present invention.

FIG. 2 is a transverse vertical sectional view, taken substantially along the line 2—2 of FIGURE 1.

FIG. 3 is a fragmentary sectional view taken substantially along the line 3—3 of FIG. 1.

FIG. 4 is an enlarged fragmentary schematic view showing the configuration of the groove in the piston in which the sealing ring fits.

FIG. 5 is an elevational view partially broken away in section and exaggerating the gap formed between the interior cylinder wall and the piston of the syringe.

As illustrated in the accompanying drawings, a cylinder or barrel 11 preferably formed of a transparent material such as nylon, is provided with a smooth bore. Fitting within the cylinder or barrel is a piston 12 composed of similar material.

The cylinder has a continuously decreasing interior cross-section from the top to the bottom of the cylinder making the space 13 between the piston and the barrel one which gradually and continuously increases from the bottom to the top. This not only facilitates entry of the piston in the cylinder but also permits elimination of the outwardly projecting cylinder lip usually attendant prior art devices of this type. Elimination of such a lip greatly facilitates packing, handling and storage of the syringe units because the outer cylinder walls of each unit are straight and units may be placed together in a close alignment thereby conserving space.

A handle 14 is applied to the top of the piston. The tapered lower end portion 16 of the cylinder is connected with the interior of the cylinder 11 by means of canal 17 and the opposite end of the canal 17 is connected to a hollow needle 18 of conventional construction.

As has been stated, a definite gap 13 is provided between the piston 12 and cylinder 11. In order to seal the piston and cylinder, a toroidal resilient ring 21 of the type known commercially as O-rings is located within a groove 22 in piston 12. The base 23 of the groove 22 is rounded and has a curvature similar to the curvature of the ring 21 so that the inside of the ring fits tightly in the bottom of the groove and no space exists therebetween in which foreign material can lodge. Outwardly of the bottom 23 the walls of the groove diverge in straight sides 24 which are disposed at an angle of substantially 60° with respect to the surface of piston 12. The straight sides 24 are tangent to the bottom 23, as shown particularly in FIG. 4.

In use, the outer edge of ring 21 seals against the inner wall of the cylinder 11 and the inner edge of the ring 21 seals against the bottom 23 of the groove 22. By reason of the resilient nature of the ring 21 and its tendency toward deformation as a result of pressure, the ring conforms to the difference in the gap between the piston and cylinder and insures a tight sealing fit regardless of whether the piston is at the top or bottom of its stroke. By reason of the slanting walls 24, sufficient room is afforded for the deformation of the ring 21 required for its successful operation. Thus, at both the filling and discharge stroke of the piston 12 a tight seal is effected which insures proper filling and complete discharge of the contents of the syringe.

Although the foregoing invention has been described by way of illustration and example for purposes of clarity

What is claimed is:

A syringe of the character described comprising a cylinder having an open top end and a bottom end formed with a discharge canal, said cylinder having a continuously decreasing interior cross section from the top of said cylinder to the bottom thereof, a piston reciprocally slidable in said cylinder toward and away from said discharge canal, said piston and said cylinder being separated by an annular gap which continuously diminishes from top to bottom, a groove in said piston adjacent the end thereof toward said discharge canal, a flexible O-ring of circular cross section in said groove and bearing against the bottom of said groove and the inner wall of said cylinder to form a seal therebetween continuously during movement of said piston, said groove being shaped with a curvature at the bottom having a radius of curvature equal to the radius of said ring and having an outwardly diverging inner side wall and an outwardly diverging outer side wall, said walls each diverging at an angle of substantially 60° with respect to the exterior of said piston, and a handle attached to said piston for reciprocating said piston, whereby said O-ring expands and contracts as said piston is reciprocated in said cylinder.

References Cited in the file of this patent

UNITED STATES PATENTS

| | | |
|---|---|---|
| 797,796 | Devlin | Aug. 22, 1905 |
| 2,360,731 | Smith | Oct. 17, 1944 |
| 2,593,193 | Rockwell | Apr. 15, 1952 |
| 2,756,748 | Ferguson | July 31, 1956 |
| 3,026,872 | Prater | Mar. 27, 1962 |

FOREIGN PATENTS

| | | |
|---|---|---|
| 268,694 | Switzerland | May 16, 1951 |